United States Patent
Hirano et al.

(10) Patent No.: US 10,371,905 B2
(45) Date of Patent: Aug. 6, 2019

(54) OPTICAL PROCESSING APPARATUS, OPTICAL CONNECTOR

(71) Applicant: SUMITOMO ELECTRIC INDUSTRIES, LTD., Osaka (JP)

(72) Inventors: Mitsuharu Hirano, Osaka (JP); Akira Furuya, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/131,601

(22) Filed: Sep. 14, 2018

(65) Prior Publication Data

US 2019/0086621 A1    Mar. 21, 2019

(30) Foreign Application Priority Data

Sep. 19, 2017   (JP) .................. 2017-179046

(51) Int. Cl.
  *G02B 6/42*    (2006.01)
  *G02B 6/30*    (2006.01)
  *F21V 8/00*    (2006.01)
  *G02B 6/34*    (2006.01)

(52) U.S. Cl.
  CPC ......... *G02B 6/4214* (2013.01); *G02B 6/0083* (2013.01); *G02B 6/30* (2013.01); *G02B 6/34* (2013.01); *G02B 6/4215* (2013.01); *G02B 6/4246* (2013.01)

(58) Field of Classification Search
  None
  See application file for complete search history.

(56) References Cited

U.S. PATENT DOCUMENTS

| 7,162,124 | B1 | 1/2007 | Gunn, III et al. |
| 2004/0114859 | A1* | 6/2004 | Colgan ................ G02B 6/3636 385/31 |
| 2018/0321450 | A1* | 11/2018 | Rosenberg ............... G02B 6/36 |

* cited by examiner

*Primary Examiner* — Chad H Smith
(74) *Attorney, Agent, or Firm* — Smith, Gambrell & Russell, LLP.

(57) ABSTRACT

An optical processing apparatus includes: a circuit hoard having first and second areas arranged in a direction of a first axis; a semiconductor device having an optical coupling element; an optical connector having an optical fiber and a holder with first and second holder parts, and the optical connector being supported by the second area and the semiconductor device disposed on the first area; and a supporting base having a thickness smaller than that of the semiconductor device. The supporting base is disposed between the second holder part and the second area. The optical fiber has a first optical fiber portion supported by the first holder part, and a second optical fiber portion held by the first and second holder parts. The first optical fiber portion has a tip end and a cladding face which is positioned with respect to the optical coupling element and is separated apart from the semiconductor device.

6 Claims, 10 Drawing Sheets

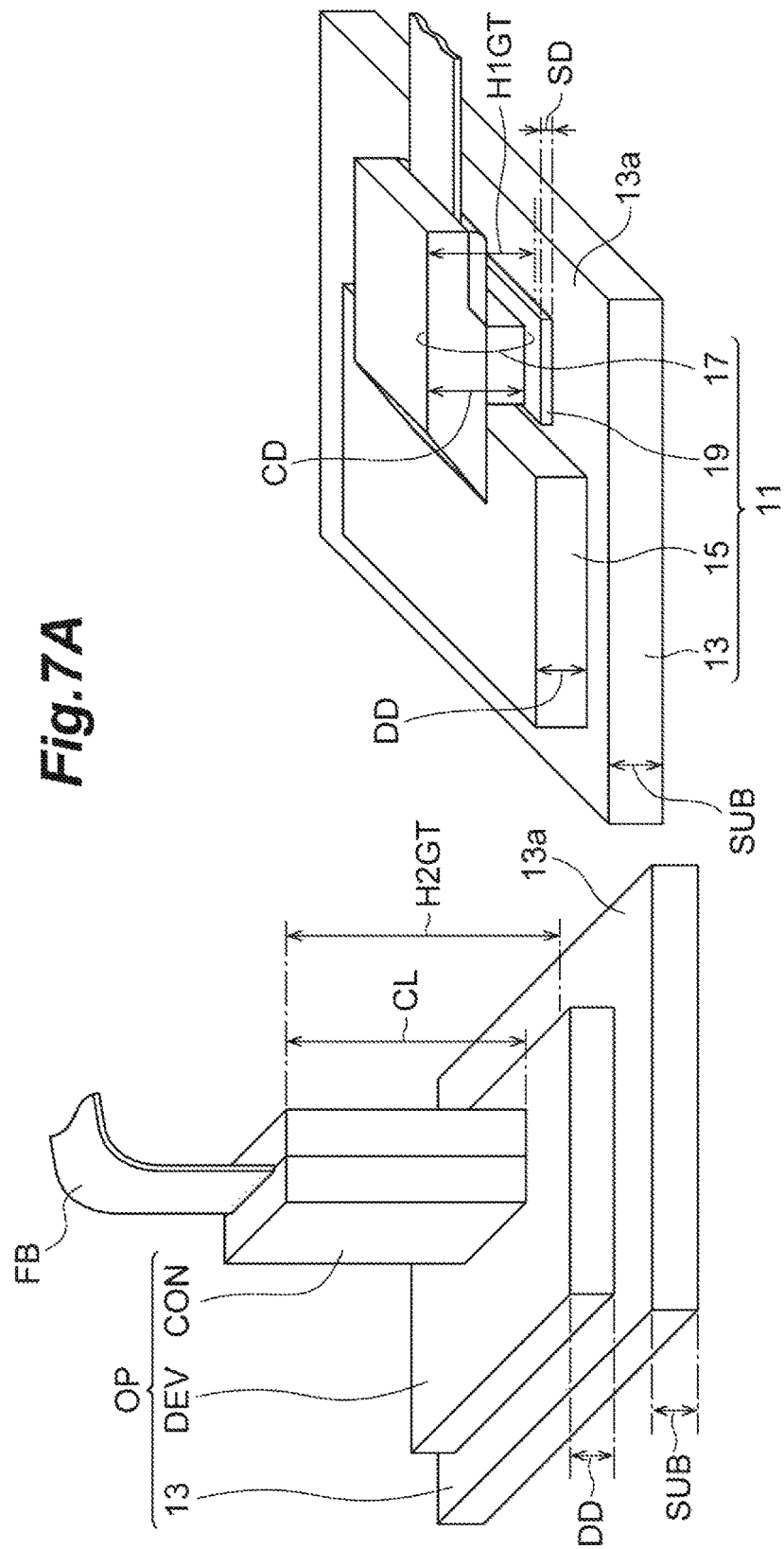

OPTICAL PROCESSING APPARATUS, OPTICAL CONNECTOR

BACKGROUND OF THE INVENTION

Field of the Invention

The present invention relates to an optical processing apparatus and an optical connector. This application claims the benefit of priority from Japanese Patent Application No. 2017-179046 filed on Sep. 19, 2017, which is herein incorporated by reference in its entirety.

Related Background Art

U.S. Pat. No. 7,162,124, hereinafter referred to as Patent Document 1, discloses optical coupling between an integrated device and optical fibers.

SUMMARY OF THE INVENTION

An optical processing apparatus according to one aspect of the present invention includes: a circuit board having a first area and a second area, the first area and the second area being arranged in a direction of a first axis; a semiconductor device having an optical coupling element, the semiconductor device being disposed on the first area of the circuit board; an optical connector having a holder and an optical fiber, the optical connector being supported by the second area of the circuit board and disposed on a principal face of the semiconductor device; and a supporting base having a thickness smaller than that of the semiconductor device. The holder has a first holder part and a second holder part. The supporting base is disposed between the second area of the circuit board and the second holder part of the optical connector. The optical fiber has a first optical fiber portion and a second optical fiber portion. The first optical fiber portion is supported by the first holder part so as to extend in the direction of the first axis, and the second optical fiber portion is held by the first holder part and the second holder part. The first optical fiber portion has a cladding face and an end portion. The cladding face extends along a first reference plane extending in the direction of the first axis. The cladding face is positioned to the optical coupling element and being apart from the principal face of the semiconductor device.

An optical connector according to another aspect of the present invention includes: a holder including a first holder part and a second holder part; and an optical fiber including a first optical fiber portion, a second optical fiber portion and a third optical fiber portion, the first optical fiber portion being supported by the first holder part so as to extend in a direction of a first axis, the second optical fiber portion being held by the first holder part and the second holder part, and the third optical fiber portion extending outward from the first holder part and the second holder part and being supported by the first holder part. The first optical fiber portion has a cladding face and an end portion. The cladding face extends along a first reference plane, and the first reference plane extends in the direction of the first axis. The first holder part and the second holder part are arranged in a direction of a second axis intersecting the first axis.

BRIEF DESCRIPTION OF THE DRAWINGS

The above-described objects and the other objects, features, and advantages of the present invention become more apparent from the following detailed description of the preferred embodiments of the present invention proceeding with reference to the attached drawings.

FIG. 7A is a schematic view showing the optical processing apparatus, including the optical connector and the semiconductor device, with arrows to indicate dimensions thereof FIG. 7B is a schematic view showing the optical processing apparatus, including the optical connector and the semiconductor device, with arrows to indicate dimensions thereof

DESCRIPTION OF THE PREFERRED EMBODIMENTS

Figure 1A:
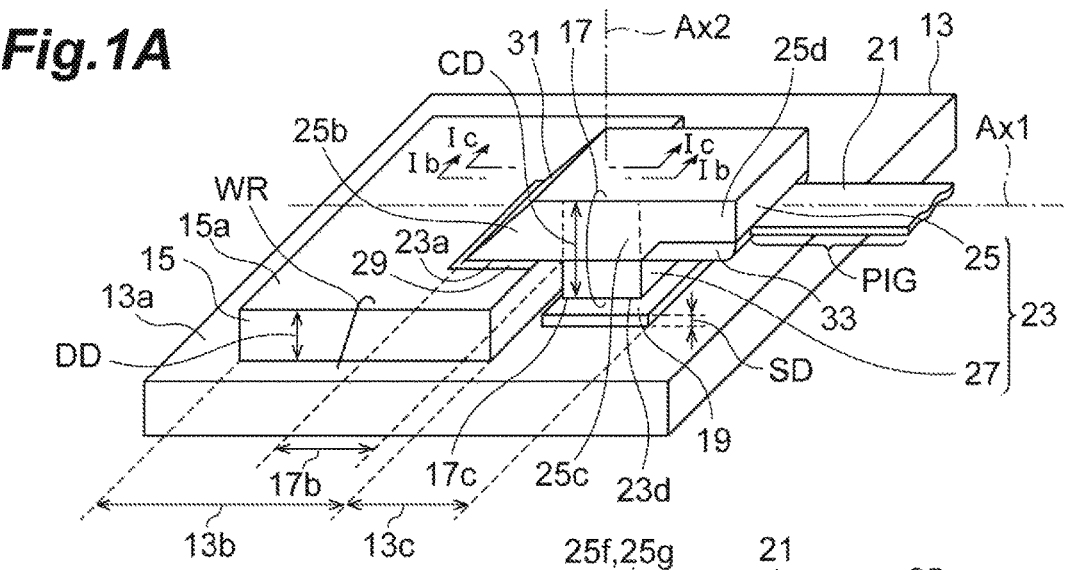
FIG. 1A is a diagrammatic perspective view showing an optical processing apparatus according to an embodiment.

In Patent Document 1, making the optical coupling between the optical fibers and the integrated device needs positioning and orientation of the optical fibers to the semiconductor device, and determining both the orientation and positions of the optical fibers with respect to the semiconductor device makes the fabricating process complicated. The inventors' findings reveal that, prior to making the optical coupling between the semiconductor device and the optical fibers, the optical fibers can be assembled with the holder to form an optical connector and that specifically, the holder in the optical connector arranges the optical fibers in the orientation and position thereof. The optical connector makes it possible to provide an optical processing apparatus that optically couples the optical fibers with the semiconductor device without the above complication. Specifically, positioning the optical connector to the integrated device on the principal face thereof can optically couple the optical fibers on the end face of the optical connector to the optical coupling elements of the integrated device. The optical processing apparatus has a height not less than the sum of the thickness of the integrated device and the length of the optical connector. The optical processing apparatus is required to have both a low height and stable optical coupling.

It is an object according to one aspect of the present invention to provide an optical processing apparatus, which includes an optical connector and a semiconductor device that are optically coupled with each other, having a structure that enables a dimension smaller than the sum of their thicknesses. It is an object according to another aspect of the present invention to provide an optical connector, which has a structure avoiding stacking of the optical connector and the semiconductor device to be optically coupled thereto, with a dimension smaller than the sum of their thicknesses.

A description will be given of several examples.

An optical processing apparatus according to an embodiment includes: (a) a circuit board having a first area and a second area, the first area and the second area being arranged in a direction of a first axis; (b) a semiconductor device having an optical coupling element, the semiconductor device being disposed on the first area of the circuit board; (c) an optical connector having a holder and an optical fiber, the optical connector being supported by the second area of the circuit board and a principal face of the semiconductor device; and (d) a supporting base having a thickness smaller than that of the semiconductor device. The holder has a first holder part and a second holder part. The supporting base is disposed between the second area of the circuit board and the second holder part of the optical connector. The optical fiber has a first optical fiber portion and a second optical fiber portion. The first optical fiber portion is supported by the first holder part so as to extend in the direction of the first axis, and the second optical fiber portion is held by the first holder part and the second holder part. The first optical fiber portion has a cladding face and an end portion. The cladding face extends along a first reference plane extending in the direction of the first axis. The cladding face is positioned to the optical coupling element and being apart from the principal face of the semiconductor device.

The optical processing apparatus is provided with the first and second holder parts of the optical connector that hold the second optical fiber portion, next to the first optical fiber portion, such that the second optical fiber portion extends in the direction of the first axis, and is provided with the first holder part that supports the second optical fiber portion such that the first optical fiber portion extends outwards in the direction of the first axis free from supporting the second holder part. The second holder part of the optical connector does not interfere with the optical coupling between the first optical fiber portion and the semiconductor device. The second holder part is fixed to the circuit board on the second area thereof with a supporting base thinner than the semiconductor device in thickness to prevent the optical connector from reaching the second area of the circuit board, so that the optical connector is supported by the semiconductor device, which is mounted on the first area of the circuit board, in addition to being supported by the second area of the circuit board. The circuit board supports the optical connector on the second area thereof at a level different from that of the optical coupling interface between the optical connector and the semiconductor device. The external force exerted on the optical connector is applied to not only the semiconductor device, which is associated with the optical coupling, but also the circuit board through the supporting base. Supporting the optical connector on both the semiconductor device and the circuit board can stabilize the optical coupling between the optical connector and the semiconductor device.

In the optical processing apparatus according to an embodiment, the connector has an oblique face extending along a second reference plane inclined to the first reference plane, the optical fiber has an end face at the tip end thereof, and the end face extends along the second reference plane.

The optical processing apparatus allows the cladding face of the optical fiber to meet the oblique end face of the optical fiber extending along the inclined end face of the optical connector. The inclination of the end face changes the direction of light associated with the optical connector to facilitate the optical coupling between the optical connector and the semiconductor device.

In the optical processing apparatus according to an embodiment, the optical connector includes a reflecting member on the oblique face.

The optical processing apparatus can reduce the optical loss in reflecting light at the reflecting member.

In the optical processing apparatus according to an embodiment, the optical fiber includes a third optical fiber portion, and the third optical fiber portion is supported by the first holder part so as to extend in the direction of the first axis.

The optical processing apparatus allows the first holder part to guide the third optical fiber portion, which extends outward from the resin, without support of the second holder part, thereby making the third optical fiber portion extend in the direction of the first reference plane and allowing the reduction in size of the second area of the circuit board that supports the second holder part.

In the optical processing apparatus according to an embodiment, the first and second optical fiber portions are arranged along the first reference plane; the first holder part has a recess recessed in a direction from the first reference plane to the first holder part; and the third optical fiber portion is fixed to the recess.

The optical processing apparatus allows the recess of the first holder part to support the optical fiber away from the circuit board.

In the optical processing apparatus according to an embodiment, the optical connector includes a pigtail fiber extending outward from the holder.

The optical processing apparatus is provided with the pigtail fiber that makes the optical coupling between the optical connector and an external device facilitated.

An optical connector according to an embodiment includes: (a) a holder having a first holder part and a second holder part; and (b) an optical fiber having a first optical fiber portion, a second optical fiber portion and a third optical fiber portion. The first optical fiber portion is supported by the first holder part so as to extend in the direction of the first axis; the second optical fiber portion is held by the first holder part and the second holder part; and the third optical fiber portion extends outward from the first holder part and the second holder part and is supported by the first holder part. The first optical fiber portion has a cladding face and a tip end. The cladding face extends along a first reference plane, and the first reference plane extends in the direction of the first axis. The first holder part and the second holder part are arranged in a direction of a second axis intersecting the first axis.

The optical connector allows the first holder part to guide the third optical fiber portion, which extends outward from the holder for the optical connector, making the third optical fiber portion extend along the first reference plane. This guiding can reduce the second holder part in size, as compared with the first holder part.

Teachings of the present invention can be readily understood by considering the following detailed description with reference to the accompanying drawings shown as examples. Referring to the accompanying drawings, an optical processing apparatus and an optical connector according to an embodiment of the present invention will be described below. To facilitate understanding, identical reference numerals are used, where possible, to designate identical elements that are common to the figures.

Figure 1B:
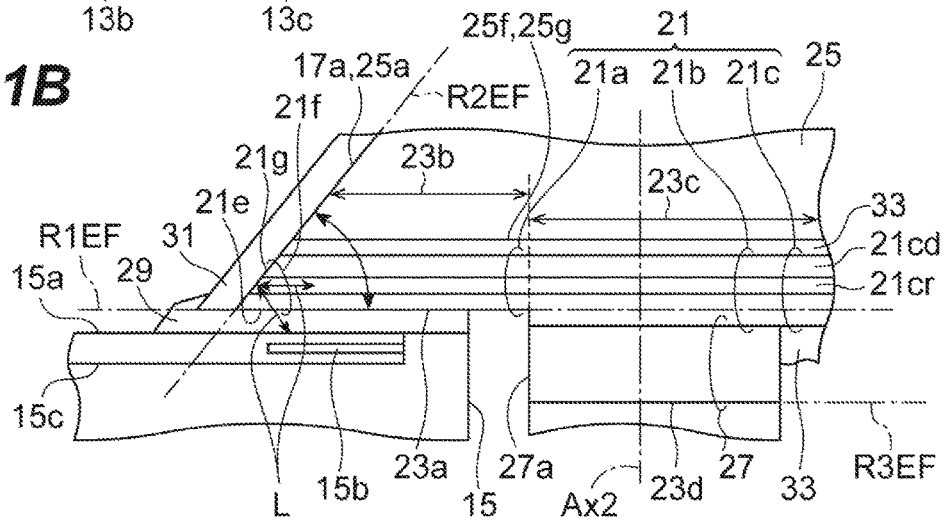
FIG. 1B is a cross sectional view taken along line Ib-Ib shown in FIG. 1A.
Figure 1C:
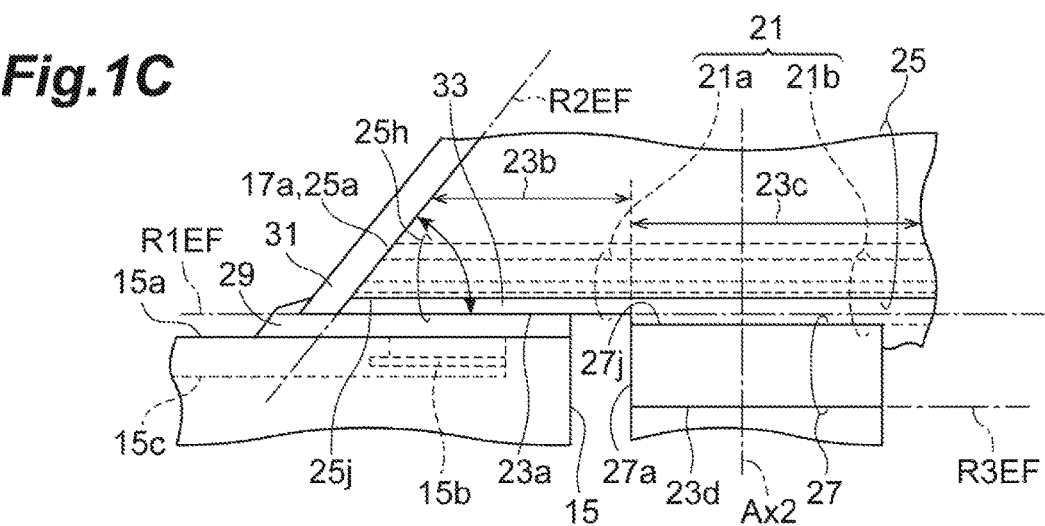
FIG. 1C is a cross sectional view taken along line Ic-Ic shown in FIG. 1A.

FIG. 1A is a perspective schematic view showing an optical processing apparatus according to the embodiment. FIG. 1B is a cross sectional view taken along line Ib-Ib shown in FIG. 1A. FIG. 1C is a cross sectional view taken along line Ic-Ic shown in FIG. 1A.

The optical processing apparatus 11 includes a circuit board 13, a semiconductor device 15, an optical connector 17, and a support base 19. The circuit board 13 has a principal face 13$a$, and the principal face 13$a$ includes a first area 13$b$ and a second area 13$c$, which are arranged in the direction of the first axis Ax1. The semiconductor device 15 also has a principal surface 15$a$. The semiconductor device 15 includes one or more optical coupling elements 15$b$, such as a grating coupler, one or more semiconductor optical elements 15$c$, such as an optical waveguide, and one or more photoelectric conversion elements, such as a photodiode, one or more semiconductor electronic elements 15$c$, such as an optical modulator and a transistor circuit. The semiconductor device 15 may include, for example, a silicon photonics device. The semiconductor device 15 is mounted on the first area 13$b$ of the circuit board 13 and connected to the circuit board 13 via a conductor WR. The optical connector 17 includes one or more optical fibers 21 and a holder 23. The optical fibers 21 in the optical connector 17 are optically coupled to the semiconductor device 15. The optical connector 17 is supported by the semiconductor device 15 on the second area 13$c$ of the circuit board 13. The optical connector 17 is fixed to the semiconductor device 15 on the principal face 15$a$ with a resin body 29. Specifically, the resin body 29 is disposed between the principal face 15$a$ of the semiconductor device 15 and the optical fibers 21 of the optical connector 17, and is transparent to light propagating in the optical fibers 21. The resin body 29 may contain, for example, a diluent, an additive, an ultraviolet curing agent and/or a thermal curing agent. In the embodiment, the holder 23 includes a first holder part 25 and a second holder part 27, each of which is made of, for example, ceramic, such as alumina or zirconia, or glass, such as quartz, Tempex (registered trademark), Pyrex (registered trademark). In the example, the first and second holder parts 25 and 27 are arranged in the direction of a second axis Ax2 intersecting that of the first axis Ax1. The support base 19 is disposed on the second area 13$c$ of the circuit board 13. Specifically, the support base 19 is disposed between the circuit board 13 and the second holder part 27 of the optical connector 17, and supports the second holder part 27 of the optical connector 17. Each of the optical fibers 21 has a first optical fiber portion 21$a$ and a second optical fiber portion 21$b$. The first optical fiber portion 21$a$ is supported by the first holder part 25 so as to extend in the direction of the first axis Ax1, and the second optical fiber portion 21$b$ is supported by the first and second holder parts 25 and 27. The first optical fiber portion 21$a$ adjoins to the second optical fiber portion 21$b$. The first holder part 25 extends backward beyond the boundary between the first and second optical fiber portions 21$a$ and 21$b$ to support the second optical fiber portion 21$b$.

The first and second holder parts 25 and 27 and the optical fiber 21 in the optical processing apparatus 11 are assembled to align the second optical fiber portion 21$b$, next to the first optical fiber portion 21$a$, in the direction of the first axis Ax1 in the optical connector 17. The first holder part 25 of the optical connector 17 supports the first optical fiber portion 21$a$ of the optical fiber 21 without being held by the second holder part 27 to make the first optical fiber portion 21$a$ extend in the direction of Ax1, thereby preventing the second holder part 27 of the optical connector 17 from interfering with the optical coupling of the first optical fiber portion 21$a$ with the semiconductor device 15. Further, the support base 19, which is thinner than the semiconductor device 15 in thickness, can separate the optical connector 17 from the second area 13$c$ of the circuit board 13. The optical connector 17 is supported by the circuit board 13 on the second area 13$c$ thereof in addition to being supported by the semiconductor device 15, which is mounted on the first area 13$b$ of the circuit board 13, on the principal face 15$a$ thereof. The circuit board 13 supports the optical connector 17 on the second area 13$c$ thereof at a level different from the level of the optical interface between the semiconductor device and the optical connector 17. External force, which may be applied to the optical connector 17 in use and during production, is also applied to the circuit board 13 in addition to the semiconductor device 15 associated with the optical coupling. The optical processing apparatus 11 allows the circuit board 13 and the semiconductor device 15 to supports the optical connector 17 at the respective levels of the second area 13$c$ and the principal face 15$a$, thereby stabilizing the optical coupling between the optical connector 17 and the semiconductor device 15.

The optical fiber 21 provides the first optical fiber portion 21$a$ with a tip end 21$f$ and a cladding face 21$e$ which extends along the first reference plane R1EF in the direction of the first axis Ax1. The cladding face 21$e$ of the optical connector 17 is positioned with respect to the optical coupling element 15$b$ of the semiconductor device 15. The optical fiber 21 includes a core 21$cr$ and a clad 21$cd$, and the cladding face 21$e$ may be distanced from the core 21$cr$ in a range of, for example, 5 micrometers or more to 30 micrometers or less. The cladding face 21$e$ may be distanced from the principal face 15$a$ of the semiconductor device 15 in a range of, for example, 1 micrometer or more to 30 micrometers or less, and the distance may be, for example, 10 micrometers.

The support base 19 has a thickness (SD) smaller than the distance (DD) of the semiconductor device 15. In the optical connector 17 that includes the first and second holder parts 25 and 27 for holding the optical fibers 21, the space (CD) between the upper face of the first holder part 25 and the lower face of the second holder part 27 is smaller than the distance (DD) of the support base 19 and the thickness (SD) of the support base 19. The distance between the upper face of the optical connector 17 and the principal face in the second area 13c of the circuit board 13 is smaller than the sum of the distance (CD) and the thickness (DD).

The support base 19 may include a flexible material, such as rubber or gel. The support base 19 has a thickness, which is defined on the second area 13c of the circuit board 13, of not more than the distance between the principal face 13a of the circuit board 13 and the lower face of the second holder part 27. The dimensional tolerance of the distance between the lower face of the second holder part 27 and the cladding face 21e can be, for example, 20 micrometers or less. The thickness tolerance of the support base 19, which is disposed between the optical connector 17 and the second area 13c of the circuit board 13, may be, for example, 30 micrometers or less. These dimensional ranges can prevent the support base 19 from creating an upward force that may weaken the optical coupling between the semiconductor device 15 and the optical connector 17 on the principal face 15a. The support base 19 may be made of material, such as deformable material, that allows the support base 19 to deform, and specifically has a Young's modulus of 100 MPa or less. In addition, in order to ensure reliable support, the support base 19 has a Young's modulus of 100 kPa or more. The dimensional tolerance of the support base 19 can be, for example, 200 micrometers or less under no-load.

In the present embodiment, the optical fiber 21 further includes a third optical fiber portion 21c, which is not supported by the second holder part 27, and the third optical fiber portion 21c is not supported by the second optical fiber portion 21b.

The optical connector 17 may have a pigtail structure. Specifically, the optical connector 17 includes a pigtail fiber extending outward from the holder 23. Using the pigtail fiber makes the optical connector 17 optically connected easily to an external device.

As shown in FIGS. 1A and 1C, the optical fiber 21, and the first and second holder parts 25 and 27 are fixed with the resin body 33 to form the holder 23. The resin body 33 may include, for example, a diluent, an additive, an ultraviolet curing agent and/or a heat hardening agent. The optical connector 17 has an inclined end face 17a, and the inclined end face 17a extends along a second reference plane R2EF which is inclined to the first reference plane R1EF. The first reference plane R1EF may form an angle in a range of, for example, zero to 90 degrees with the second reference plane R2EF. The optical connector 17 provides the second holder part 27 with a front end face 27a at the boundary between the first and second optical fiber portions 21a and 21b, and the front end face 27a extends along a direction intersecting that of the first axis Ax1. The front end face 27a is separated from the side face of the semiconductor device 15.

In the present embodiment, the first holder part 25 has a guiding portion that enables positioning the optical fibers 21, and the guiding portion 25f aligns the optical fibers 21 to extend in the direction of the first axis Ax1. Specifically, the guiding portion 25f has, for example, an arrangement of grooves 25g, and each groove extends in the direction of the first axis Ax1. The grooves 25g thus arranged receive the optical fibers 21 therein to position the optical fibers 21.

The holder 23 includes a first portion 23b and a second portion 23c, which are arranged in the direction of the first axis Ax1. In the holder 23 of the optical connector 17, the first portion 23b guides the first optical fiber portion 21a such that the first optical fiber portion 21a extends in the direction of the first axis Ax1, and the second portion 23c holds the first optical fiber portion 21a such that the second optical fiber portion 21b extends in the direction of the first axis Ax1. The first and second portions 23b and 23c have a first holder face 23a and a second holder face 23d, respectively, and the first and second holder faces 23a and 23d extend in the direction of the first axis Ax1. The holder 23 is provided with the first and second holder faces 23a and 23d, which are arranged at respective levels different from each other in the direction of the second axis Ax2. The first and second holder faces 23a and 23d are supported by the semiconductor device 15 and the support base 19, respectively. The first holder face 23a is provided with the cladding face 21e and the resin face of the resin body 33, which is disposed on the first holder part 25, and the second holder face 23d is provided by the second holder part 27.

Referring to FIG. 1B, the first optical fiber portion 21a of the optical fiber 21 has a cladding face 21e and a tip end portion 21f. The cladding face 21e extends along the first reference plane R1FE that intersects the second axis Ax2. Specifically, the cladding face 21e meets the inclined end face 17a (25a) to form an edge, and extends from the edge in the direction of the first axis Ax1 toward the front end face 27a of the second holder part 27.

The optical connector 17 is disposed on the semiconductor device 15 to optically couple the optical coupling element 15b with the cladding face 21e of the optical connector 17, so that the optical fiber 21 is optically coupled to the optical coupling element 15b via both the principal face 15a of the semiconductor device 15 and the cladding surface 21e of the optical fiber 21. The tip end 21f of the optical fiber 21 is positioned to the optical coupling element 15b. The optical fiber 21 has an inclined end face 21g extending along the second reference plane R2EF at the tip end 21f. The optical processing apparatus 11 provides the optical fiber 21 with the cladding face 21e that meets the end face 21g inclined along the oblique end face 17a of the optical connector 17. Providing the optical connector 17 with the inclined end face 17a makes it easy to change the direction of the propagating light L so that the optical connector 17 is optically coupled to the semiconductor device 15.

Referring to FIG. 1C, in the present embodiment, the first holder part 25 has multiple raised portions (ridges) 25h that define the grooves 25g. The raised portions (ridges) 25h extend in the direction of the first axis Ax1 on the first holder faces 23a. In the raised portions (ridges) 25h of the holder 23 holding the optical fiber 21 by using the first and holder parts 25 and 27, the resin body 33 fills a gap between the first faces 25j and 27j of the first and second holder parts 25 and 27 to fix the first holder part 25 to the second holder part 27.

The optical connector 17 includes a reflecting member 31 which is disposed on the tip end 21f of the first optical fiber portion 21a. The reflecting member 31 can reduce optical loss caused by the reflection that changes the direction of light propagating in the optical connector 17. In the embodiment, the reflecting member 31 is disposed on the inclined end face 17a.

Figure 2A:
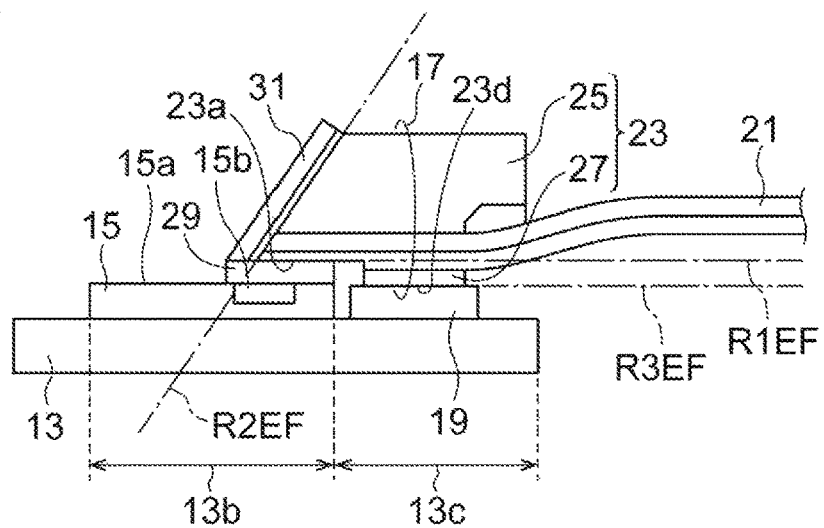
FIG. 2A is a schematic view showing an exemplary structure of the optical processing apparatus according to the embodiment.
Figure 2B:
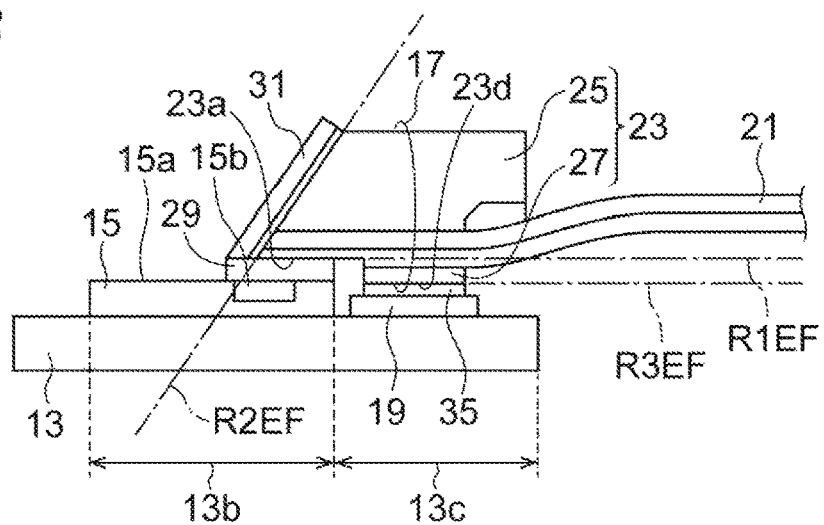
FIG. 2B is a schematic view showing an exemplary structure of the optical processing apparatus according to the embodiment.
Figure 2C:
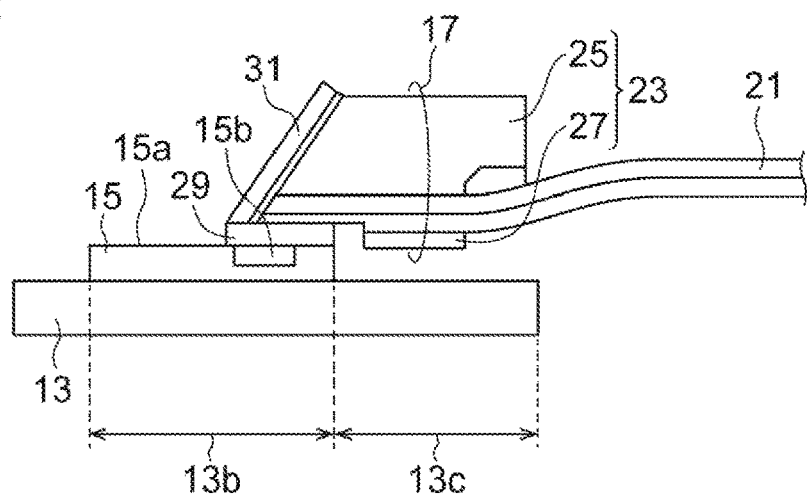
FIG. 2C is a schematic view showing an exemplary structure of the optical processing apparatus according to the embodiment.

FIGS. 2A, 2B and 2C are schematic views each showing an exemplary structure in the optical processing apparatus.

(Structure 1)

The second holder part 27 of the optical connector 17 is supported by the support base 19 that is disposed on the second area 13c of the circuit board 13. The optical connector 17 is also fixed to the principal face 15a of the semiconductor device 15 with a resin body 29. Specifically, as shown in FIG. 2A, the lower face of the second holder part 27 of the optical connector 17 can be brought into close contact with the upper face of the support base 19, which is disposed on the second region 13c of the circuit board 13. The second holder part 27 is made thinner than the first holder part 25 in thickness.

Exemplary Structure 1

The second holder part 27 of the optical connector 17: a thickness of 500 micrometers.

The support base 19: a thickness of 200 micrometers.

(Structure 2)

The second holder part 27 of the optical connector 17 is supported by the support base 19 on the second area 13c of the circuit board 13. The optical connector 17 is fixed to the principal face 15a of the semiconductor device 15 with the resin body 29. More specifically, as shown in FIG. 2B, the second holder part 27 is separated slightly apart from the support base 19 to form a space between the lower face of the second holder part 27 and the support base 19, and the space is filled with a resin body 35. The resin body 35 may include, for example, a diluent, an additive, an ultraviolet curing agent and/or a thermal curing agent. The resin body 35 fixes the second holder part 27 to the support base 19 at the lower face of the second holder part 27. The second holder part 27 is made thinner than the first holder part 25 in thickness.

Exemplary Structure 2

The second holder part 27 of the optical connector 17: a thickness of 500 micrometers.

The support base 19: a thickness of 180 micrometers.

The resin body 35: a thickness of 20 micrometers.

(Structure 3)

The second holder part 27 of the optical connector 17 is not supported by the circuit board 13. Specifically, the lower face of the second holder part 27 is apart from the principal face of the second area 13c of the circuit board 13. The resin body 29 that fixes the optical connector 17 to the principal face 15a of the semiconductor device 15 receives an external force that may be applied via the optical fiber 21.

Exemplary Structure 3

Spacing between the lower face of the second holder part 27 and the principal face 13a of the second region 13c of the circuit board 13: 200 micrometers FIGS. 3A and 3B, FIGS. 4A and 4B, and FIGS. 5A, 5B and 5C are schematic views each showing a major step in a method for fabricating an optical processing apparatus according to the present embodiment. A description will be given of the method for fabricating the optical processing apparatus with reference to FIGS. 3A to 5C below. To facilitate understanding, the reference numerals in FIGS. 1A to 1C and FIGS. 2A to 2C are used in subsequent descriptions if possible.

Figure 3A:
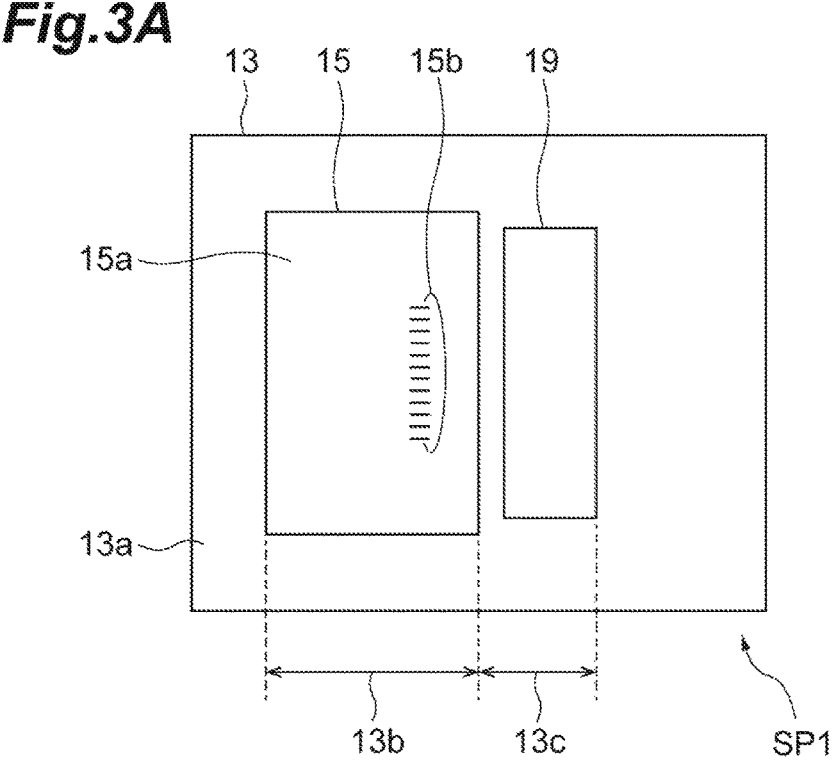
FIG. 3A is a schematic view showing a major step in a method for fabricating an optical processing apparatus according to the embodiment.
Figure 4A:
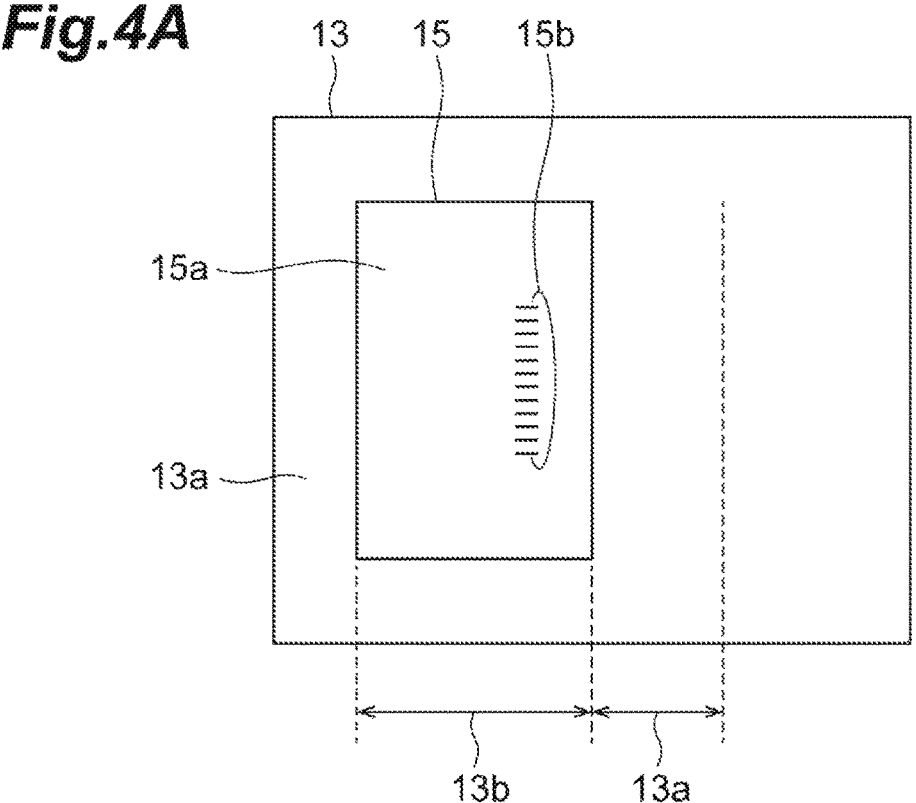
FIG. 4A is a schematic view showing a major step in the method according to the embodiment.
Figure 4B:
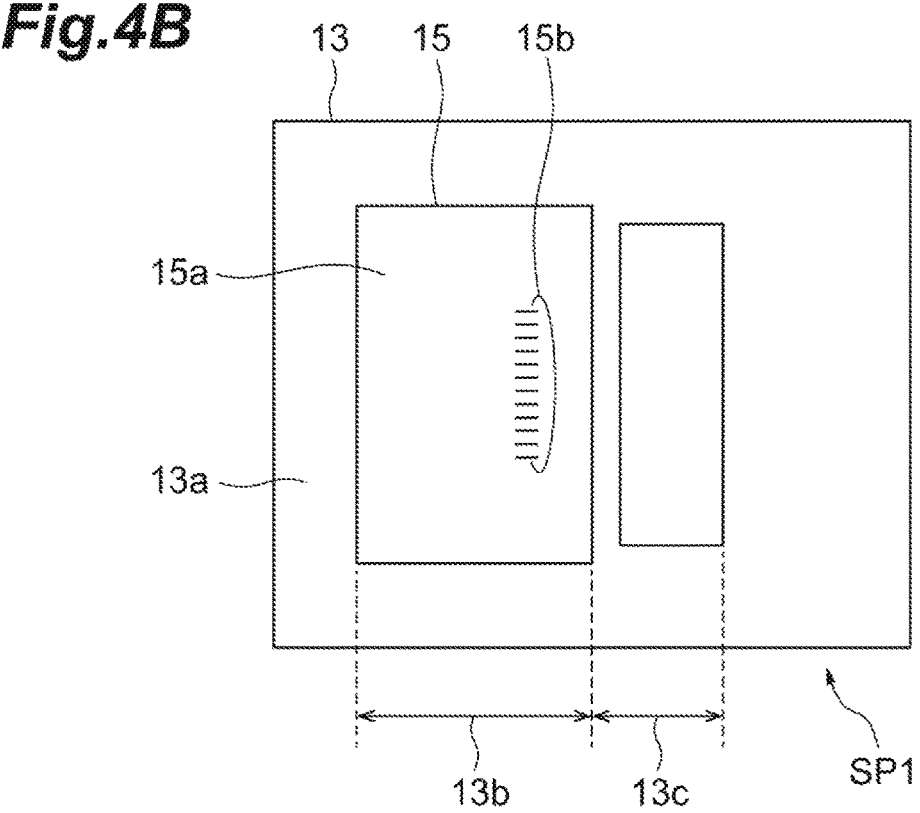
FIG. 4B is a schematic view showing a major step in the method according to the embodiment.

Step S101 includes, as shown in FIG. 3A, preparing a first intermediate product SP1 having the semiconductor device 15 and the support base 19 that the circuit board 13 mounts on the first and second regions 13b and 13c thereof, respectively. The semiconductor device 15 is provided with optical coupling elements 15b arranged therein. Specifically, the step includes preparing the circuit board 13, the semiconductor device 15 and the support base 19, and arranging the semiconductor device 15 and the support base 19 on the first and second regions 13b and 13c of the circuit board 13, respectively, to form a first intermediate product SP1. Specifically, as shown in FIG. 4A, the circuit board 13 mounts the semiconductor device 15 on the first region 13b thereof. This mounting process includes reflowing at a temperature of 300 degrees Celsius, for example, by use of solder. As shown in FIG. 4B, the circuit board 13 mounts the support base 19 on the second region 13c. This mounting process includes, for example, welding or bonding. In the embodiment, mounting the support base 19 follows mounting the semiconductor device 15. If possible, in order to avoid exerting thermal stress on the support base 19 thus mounted, mounting the semiconductor device 15 follows mounting the support base 19. In the first intermediate product SP1, the semiconductor device 15 and the support base 19 are positioned on the circuit board 13 to the first and second areas 13b and 13c thereof, respectively.

Figure 3B:
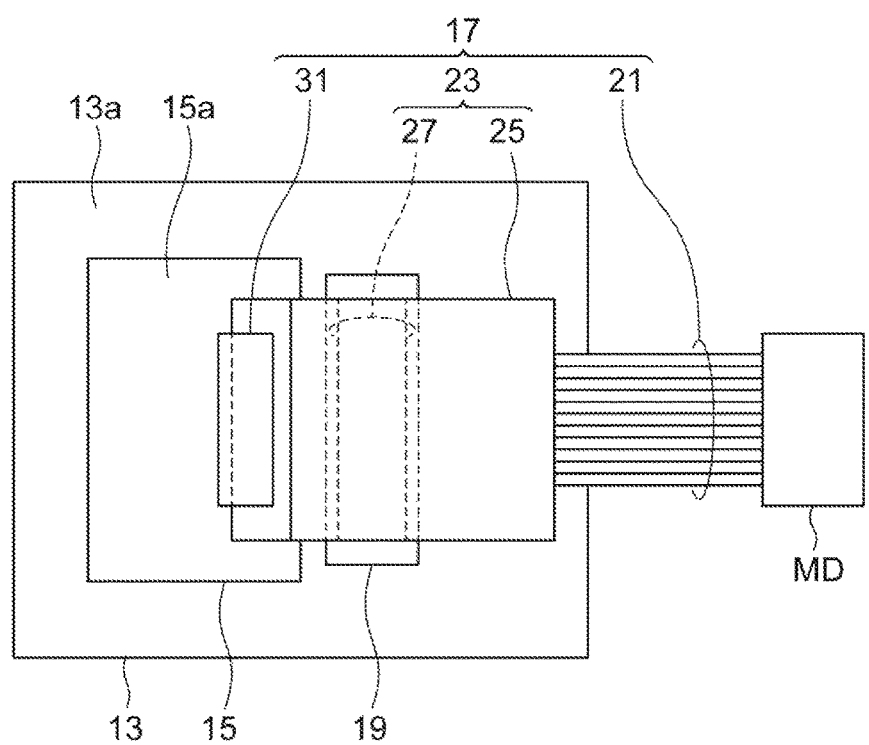
FIG. 3B is a schematic view showing a major step in the method according to the embodiment.

Step S102 includes, as shown in FIG. 3B, preparing the optical connector 17, and then positioning the optical connector 17 to the first intermediate product SP1. Specifically, one of the semiconductor device 15 and the optical connector 17 is moved relative to the other by active alignment so that the arrangement of the optical fibers 21 of the optical connector 17 is optically coupled to that of the optical coupling elements 15b of the semiconductor device 15. The support base 19 has an upper face the size of which is larger than that of the lower face of the second holder part 27 of the optical connector 17. This difference in size between the upper and lower faces allows the support base 19 to support the entirety of the lower face, which may have variations in dimensions, of the second holder part 27 on the upper face of the support base 19.

Figure 5A:
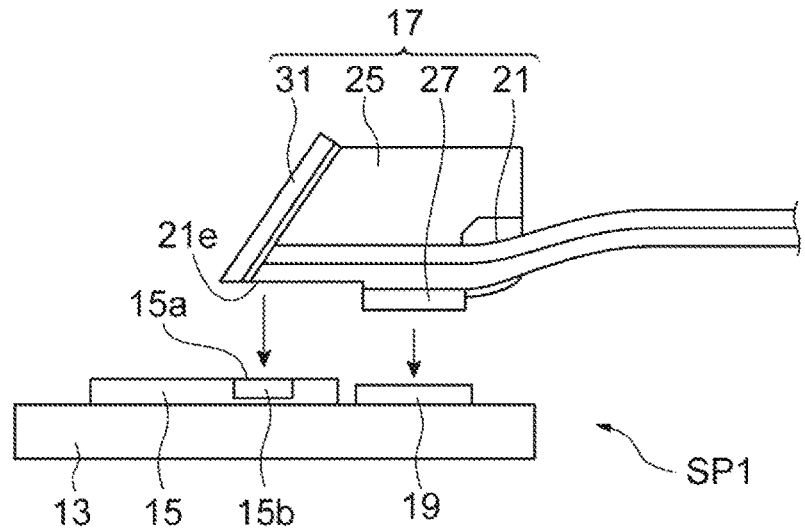
FIG. 5A is a schematic view showing a major step in the method according to the embodiment.
Figure 5B:
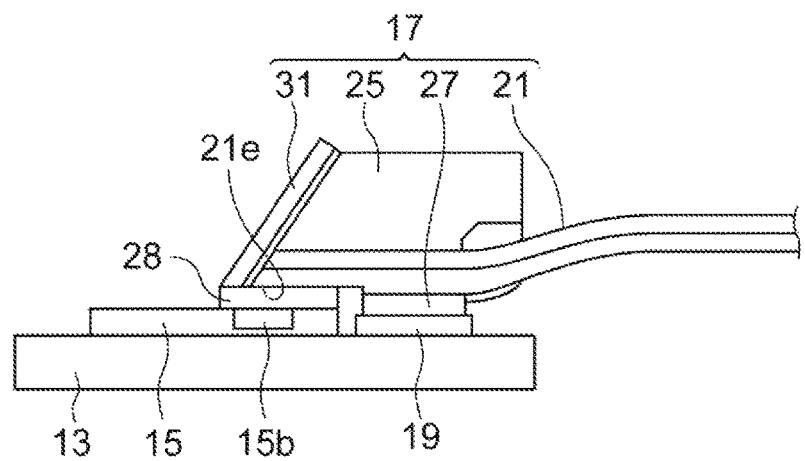
FIG. 5B is a schematic view showing a major step in the method according to the embodiment.
Figure 5C:
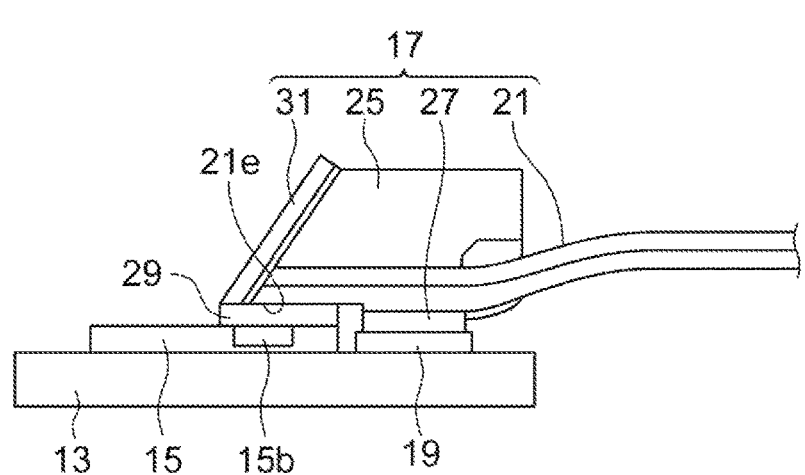
FIG. 5C is a schematic view showing a major step in the method according to the embodiment.

In the embodiment, as shown in FIG. 5A, the optical connector 17 is disposed on the first intermediate product SP1 such that the semiconductor device 15, which is located on the first area 13b of the circuit board 13, supports the cladding face 21e of the optical connector 17 on the principal face 15a thereof and that the support base 19, which is located on the second area 13c of the circuit board 13, supports the second holder part 27 of the optical connector 17. Prior to or after arranging the optical connector 17 and the first intermediate product SP1, as shown in FIG. 5B, resin 28 is supplied to the cladding face 21e of the optical connector 17 and the principal face 15a of the semiconductor device 15. The resin 28 contains at least one of ultraviolet- and heat-curing agents, and then the optical fibers 21 of the optical connector 17 are optically connected to the measuring device (the measuring device MD as shown in FIG. 3B). The light source of the measuring device MD supplies light to the optical fibers 21 of the optical connector 17, and the light beams reach the respective light receiving elements of the measuring device MD via the semiconductor device 15 and the optical connector 17. The optical connector 17 and the semiconductor device 15 are optically aligned with each other using the measuring device MD. This optical alignment brings the support base 19 into close contact with the lower face of the second holder part 27. After this optical positioning, as shown in FIG. 5C, the resin 28 is solidified by curing treatment, and the cladding face of the optical connector 17 is fixed to the semiconductor device 15 by the resin body 29. This fixation makes the cladding face 21e of the optical connector 17 and the optical coupling element 15b of the semiconductor device 15 optically coupled to each other. The optical connector 17 is supported by the semiconductor device 15 and the support base 19.

Figure 6A:
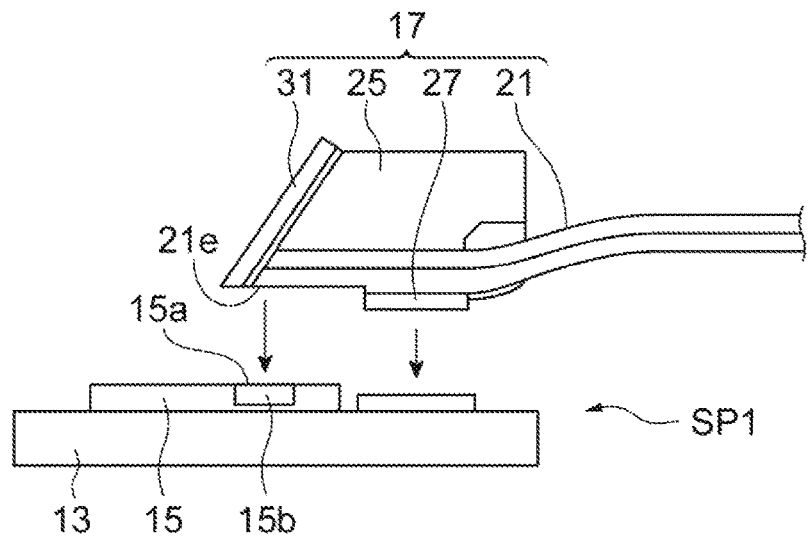
FIG. 6A is a schematic view showing a major step in the method according to the embodiment.

Alternatively, in the embodiment, as shown in FIG. 6A, the optical connector 17 is disposed on the first intermediate product SP1 such that the semiconductor device 15, which is located on the first area 13b of the circuit board 13, supports the cladding face 21e of the optical connector 17 on the principal face 15a thereof and that the support base 19 on the second area 13c supports the second holder part 27 of the optical connector 17. Prior to or after arranging the optical connector 17 and the first intermediate product SP1, the resin 28 is applied to the cladding face 21e of the optical connector 17 and the principal face 15a of the semiconductor device 15, and the measuring device (the measuring device MD shown in FIG. 3B) is connected to the optical fibers 21 of the optical connector 17. The measuring device MD allows the light source thereof to supply a light beam to an optical fiber 21 of the optical connector 17, so that the light beam returns the measuring device MD to the light receiving device thereof via the semiconductor device 15 and the optical connector 17. The measuring device MD provides the optical positioning and fixation of the optical connector 17 and the semiconductor device 15.

Specifically, the following procedure allows the optical positioning and fixation of the optical connector 17 and the semiconductor device 15 according to the present embodiment.

Figure 6B:
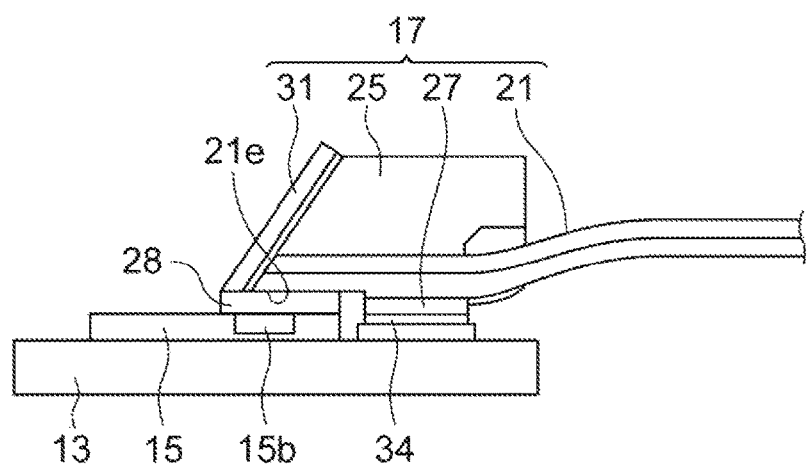
FIG. 6B is a schematic view showing a major step in the method according to the embodiment.
Figure 6C:
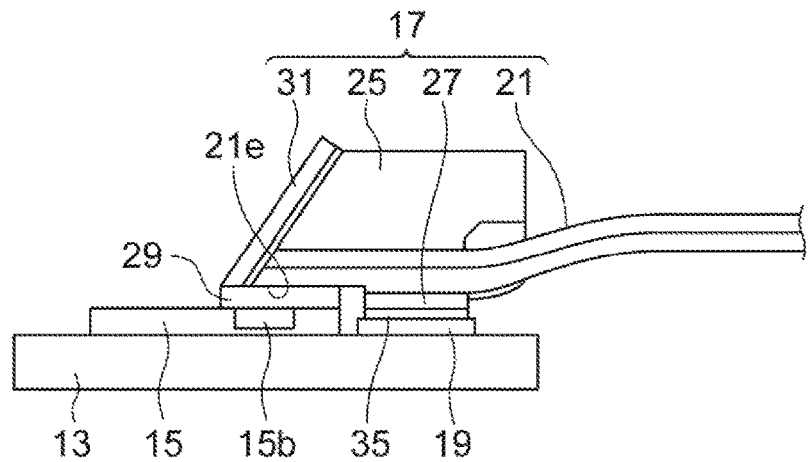
FIG. 6C is a schematic view showing a major step in the method according to the embodiment.

Prior to the optical positioning, as shown in FIG. 6B, the resin 28 is applied between the cladding face 21*e* of the optical connector 17 and the principal face 15*a* of the semiconductor device 15. The resin 28 contains at least one of ultraviolet-curing and heat-curing agents. After supplying of the resin 28 and the alignment, the resin 28 is cured to form the resin body 29, thereby fixing the optical connector 17 to the semiconductor device 15. This fixation can optically couple the cladding face 21*e* of the optical connector 17 to the optical coupling element 15*b* of the semiconductor device 15, and allows the semiconductor device 15 to support the optical connector 17.

After or prior to fixing the optical connector 17 to the semiconductor device 15, the resin 34, which contains at least one of ultraviolet-curing and heat-curing agents, is applied to the lower face of the second holder part 27 and the support base 19, and the optical connector 17 is pressed against the support base 19. In addition to fixing the cladding face 21*e* of the optical connector 17 to the semiconductor device 15 by the resin body 29, the resin 34 is cured to form the resin body 35 that fixes the lower face of the second holder part 27 to the support base 19. The fixation allows both the semiconductor device 15 and the support base 19, which are arranged on the circuit board 13, to support the optical connector 17 at the different heights thereof.

Specifically, the optical connector 17 is aligned on the semiconductor device 15 to the array of the optical coupling elements 15*b* of the semiconductor device 15, and the resin 34 is disposed between the first intermediate product SP1 and the optical connector 17. The resin is cured after bringing the alignment to completion with a desired precision. In this alignment, the optical connector 17 is apart from the support base 19 to form a gap (having, for example, a space of 1 to 50 micrometers). This gap is filled with the resin 34, which is supplied thereto, and the resin 34 is cured to form a resin body 35, which fixes the optical connector 17 to the support base 19. A resin having a low viscosity (5000 cP or less) can easily spread over the above-mentioned gap. Using a resin of a viscosity (100 cP or more) which is not too low can prevent the resin 34 from running over the top face of the support base 19 to the principal face 13*a* of the circuit board 13. The curing of the resin 34 follows the above alignment. The optical connector 17 is fixed to the semiconductor device 15 with the resin 28, and then is fixed to the support base 19 with the resin 34.

The above steps bring the optical processing apparatus 11 to completion.

FIGS. 7A and 7B are schematic views showing the dimensions of the semiconductor device, the optical connector, and the optical processing apparatus. Referring to FIG. 7A, a description will be given of the optical processing device 11, which includes the optical connector 17 and the semiconductor device 15 that are amounted by the circuit board 13 on the principal face 13*a* thereof. The height H1GT, which is defined as a distance from the principal face 13*a* of the circuit board 13 to the upper end of the optical connector 17, is equal to the sum of the height (CD) of the optical connector 17 and the thickness (SD) of the support base 19, and is smaller than the sum of the height H1GT and the thickness of the semiconductor device 15. The height H1GT is, for example, about 2.5 millimeters. Referring to FIG. 7B, a description will be given of the optical processing device OP, which includes the semiconductor device DEV and the optical connector CON that are mounted by the circuit board 13 on the principal face 13*a*. The height H2GT, which is defined as a distance from the principal face 13*a* of the circuit board 13 to the upper end of the optical connector CON, is the sum of the length (CL) of the optical connector 17 and the thickness (DD) of the semiconductor device DEV, and is, for example, about 3 millimeters. In the optical processing apparatus OP, the pigtail fiber FB extends from the end of the optical connector CON.

FIGS. 8A and 8B, FIGS. 9A and 9B and FIGS. 10A to 10C are schematic views each showing a major step in the method for fabricating the optical connector according to the present embodiment. A description will be given of the method according to the embodiment with reference to FIGS. 8A to 10C. To facilitate understanding, the reference numerals in FIGS. 1A to 2C are also used in the subsequent description, if possible.

Figure 8A:
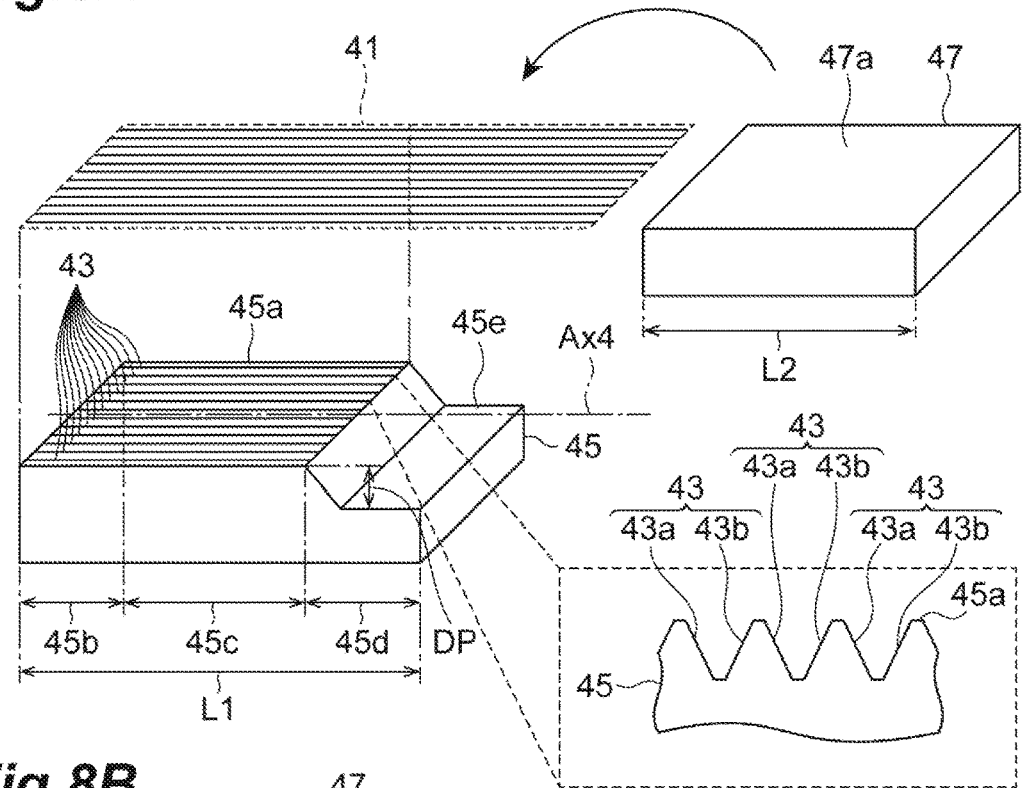
FIG. 8A is a schematic view showing a major step in the method according to the present embodiment.

Step S201 includes, as shown in FIG. 8A, preparing one or more optical fibers 41, and first and second parts 45 and 47 for a holder. In the embodiment, each of the first and second parts 45 and 47 has a lateral width that can provide, for example, a single holder. The first and second parts 45 and 47 include, for example, glass, in particular quartz, Tempax (trademark), Pyrex (trademark), or ceramic, such as alumina or zirconia. These materials can provide the resultant product, which is formed by machining in the subsequent process, with a desired accuracy.

The second part 47 has a first face 47*a* which supports an array of optical fibers, and the first face 47*a* is made substantially flat. The first part 45 has a first face 45*a* which supports the array of optical fibers. The first part 45 has a first region 45*b*, a second region 45*c*, and a third region 45*d*, which are arranged in order in the direction of the fourth axis Ax4. The first face 45*a* of the first and second regions 45*b* and 45*c* has one or more grooves 43 which can receive the optical fibers therein, and the grooves 43 extend in the direction of the fourth axis Ax4. Specifically, each of the grooves 43 includes a first support face 43*a* and a second support face 43*b* that support the side face of the fiber. The grooves 43 terminate at the boundary between the second and third regions 45*c* and 45*d*, and the third region 45*d* terminates at the boundary between the first region 45*b* and a recess 45*e* that is disposed on the first face 45*a* of the second region 45*c*. The depth DP of the recess is, for example, about 100 to 500 micrometers. The second part 47 has a length which allows the second part 47 to cover the first and second regions 45*b* and 45*c* of the first part 45. The length L1 of the first part 45 is, for example, about 3000 to 8000 micrometers, and the length L2 of the second part 47 is, for example, about 2000 to 5000 micrometers.

Figure 8B:
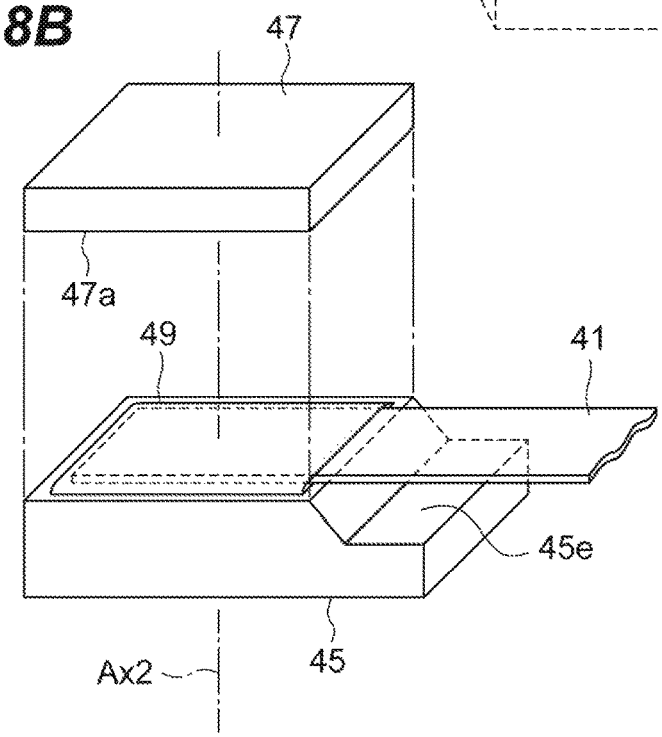
FIG. 8B is a schematic view showing a major step in the method according to the present embodiment.

As shown in FIG. 8B, the optical fibers 41 are disposed in the grooves 43 of the first part 45, and resin 49 is applied to the optical fibers 41 and the first and second regions 45*b* and 45*c* of the first part 45. If necessary, the resin 49 can be further applied to the third region 45*d*. After the application of the resin 49, the second part 47 is disposed on the first part 45 and the optical fibers 41, so that the first and second parts 45 and 47 are arranged in the direction of the second axis Ax2. The optical fibers 41 extend between the first and second regions 45b and 45c of the first and second parts 45 and 47, and the optical fibers 41 that extend outward from the first and second parts 45 and 47 run away from the third region 45d of the first part 45 while hanging down toward the third region 45d.

Figure 9A:
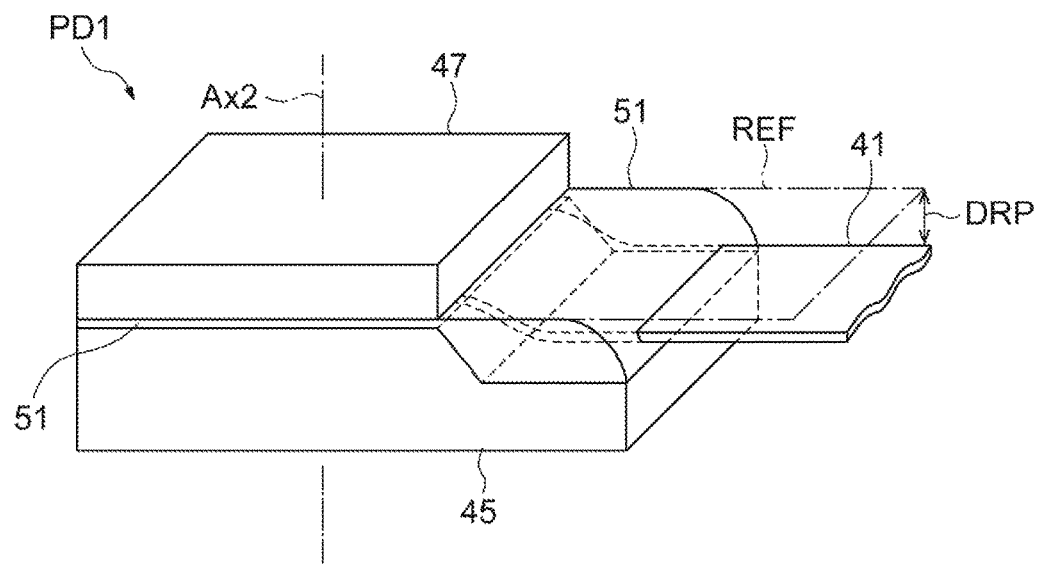
FIG. 9A is a schematic view showing a major step in the method according to the present embodiment.

Step S203 includes, as shown in FIG. 9A, curing the resin 49 to fix the optical fibers 41 to the second part 47 and the first and second regions 45b and 45c of the first part 45. The optical fibers 41 are fixed to the third region 45d to form a first product PD1. The cured resin 49 is hereinafter referred to as a resin body 51. In the first product PD1, the optical fibers 41 are arranged between the first and second regions 45b and 45c of the first and second parts 45 and 47 along the reference plane REF that intersects the second axis Ax2. The optical fibers 41 that extend outward from the first and second parts 45 and 47 run in the resin body 51 on the third region 45d while slightly curving in a direction from the second part 47 to the first part 45 with respect to the reference plane REF. The optical fibers 41 droop by an amount DRP of, for example, about 0 to 300 micrometers.

Figure 9B:
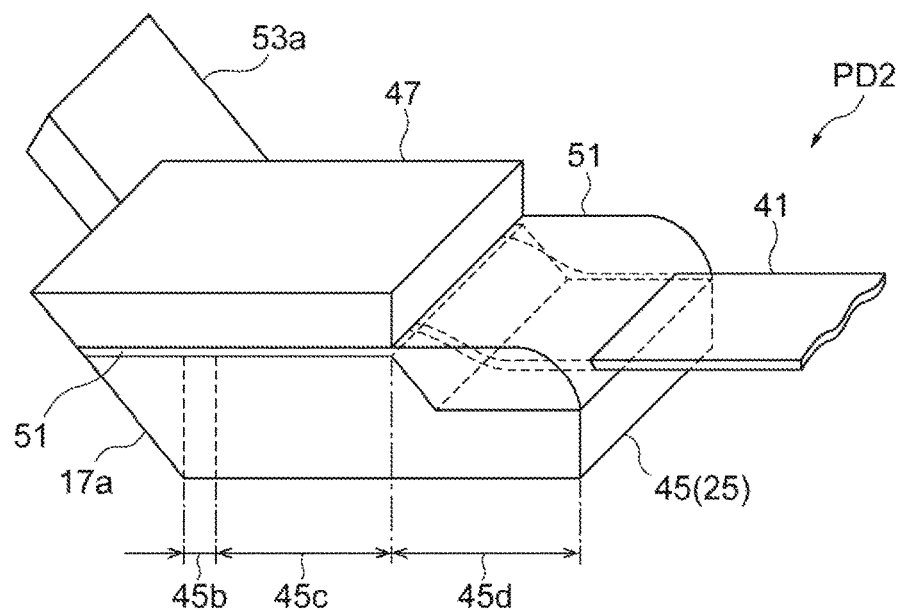
FIG. 9B is a schematic view showing a major step in the method according to the present embodiment.

As shown in FIG. 9B, step S204 includes polishing, with a processing apparatus 53a, one end of the first product PD1, specifically, the first region 45b of the first part 45 and the second part 47 that is on the first region 45b in the first product PD1, thereby form an oblique end face 17a, which is inclined with respect to the reference plane REF. Processing the first part 45 forms the first holder part 25 to provide a second product PD2.

Figure 10A:
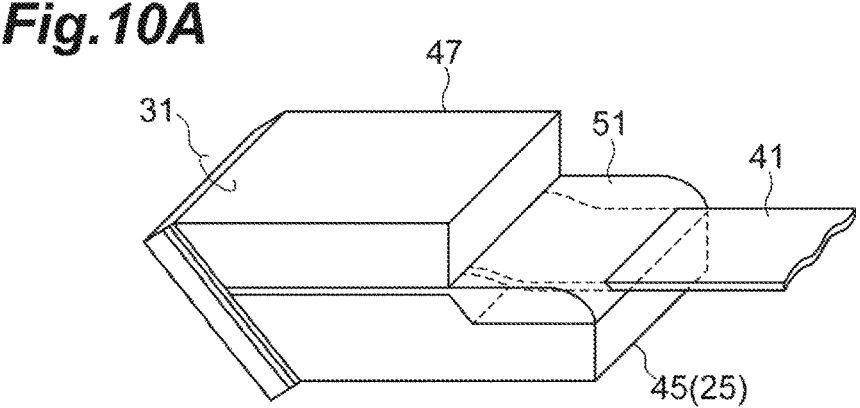
FIG. 10A is a schematic view showing a major step in the method according to the present embodiment.

Step S205 includes, as shown in FIG. 10A, fixing the reflecting member 31 to the inclined end face 17a of the second product PD2 using an adhesive to form a third product PD3.

Figure 10B:
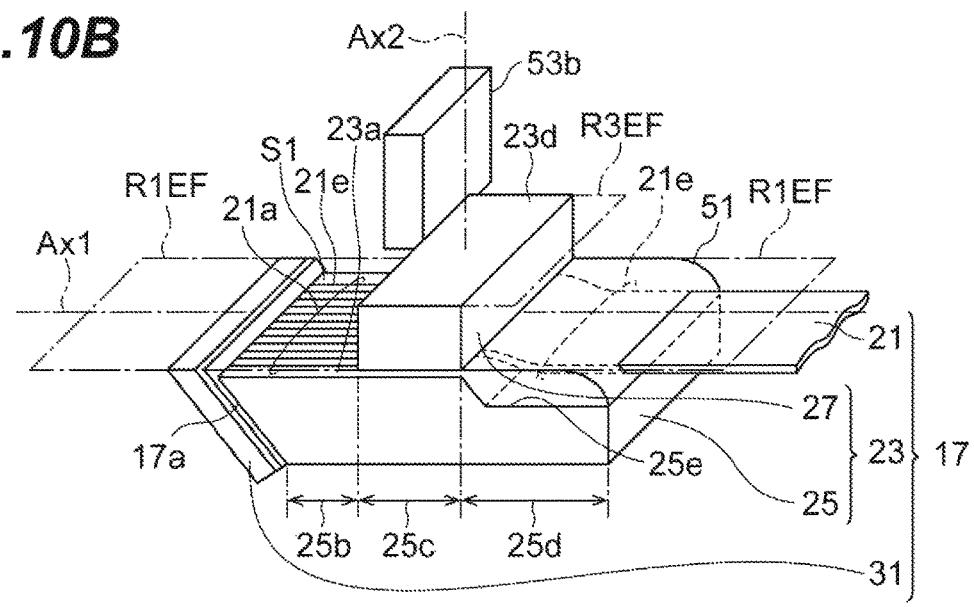
FIG. 10B is a schematic view showing a major step in the method according to the present embodiment.

Step S206 includes, as shown in FIG. 10B, processing one end of the third product PD3, specifically, the reflecting member 31 and the second part 47 of the third product PD3 with a processing device 53b to remove a part of the second part 47 located on the first region 45b of the first part 45. In the embodiment, this step does not process the first part 45. Removing a part of the second part 47 produces the optical fibers 21, which includes the cladding faces 21e, from the optical fibers 41.

The above steps bring the optical connector 17 to completion.

Referring to FIGS. 1A, 1B, 1C and 10B, the optical connector 17 includes a holder 23, multiple optical fibers 21, and a resin body 51. The holder 23 includes a first holder part 25 and a second holder part 27. The first holder part 25 includes a first region 25b, a second region 25c, and a third region 25d, and the first region 25b, the second region 25c, and the third region 25d are arranged in the direction of the first axis Ax1. The second holder part 27 is not disposed on the first and third regions 25b and 25d of the first holder part 25, but is disposed on the second region 25c. The optical fibers 21 each include a first optical fiber portion 21a supported by the first region 25b of the first holder part 25 so as to extend in the direction of the first axis Ax1 between the first and second holder portions 25 and 27, a second optical fiber portion 21b held between the first holder part 25 and the second holder part 27, and a third optical fiber portion 21c supported by the first holder part 25 and extending outward from the first and second holder parts 25 and 27 in the direction of the first axis Ax1. The resin body 51 fixes the second region 25c of the first holder part 25, the optical fibers 21, and the second holder part 27 to each other, and fixes the third optical fiber portion 21c to the third region 25d of the first holder part 25.

The first holder part 25 is provided with a recessed portion 25e which is recessed in the direction from the first reference plane R1EF to the first holder part 25. The third optical fiber portion 21c is held by the recessed portion 25e and the resin body 51.

Figure 10C:
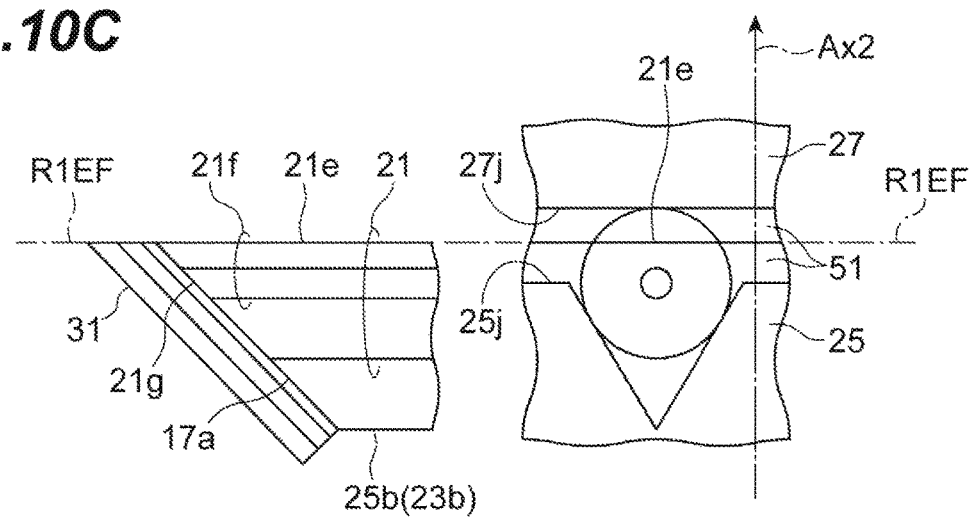
FIG. 10C is a schematic view showing a major step in the method according to the present embodiment.

FIG. 10C is a cross sectional view showing the tip ends of the optical fibers, which are formed thereby, and a holder end face and fiber front ends which are formed by machining. FIG. 10C depicts the first reference plane R1EF and the holder end face on the cross section. The optical fibers 21 each include a cladding face 21e, and a tip end 21f of the first optical fiber portion 21a thereof. The cladding face 21e extends along the first reference plane R1EE, which intersects the second axis Ax2, and the tip end 21f can be optically coupled to an external optical element via the cladding face 21e.

In the optical connector 17, the first holder part 25 holds the third optical fiber portion 21c so as to extend along the first reference plane R1EF, and allows the reduction of the second holder part 27 in size as compared to the first holder part 25.

Referring again to FIGS. 1A to 2C, as understood from the above description, in the optical processing device 11, the optical fibers 21 each are provided with a first optical fiber portion 21a having the tip end 21f and the cladding face 21e, a second optical fiber portion 21b adjoining to the first optical fiber portion 21a, and a third optical fiber portion 21c adjoining to the second optical fiber portion 21b. The holder 23 of the optical connector 17 includes a first portion 23b that guides the first optical fiber portion 21a such that the first optical fiber portion 21a extends in the direction of the first axis Ax1, and a second portion 23b that guides the second fiber portion 21b such that the second optical fiber portion 21b extends in the direction of the first axis Ax1. The support base 19 is disposed between the second area 13c of the circuit board 13 and the second portion 17c of the optical connector 17. The first portion 23b of the holder 23 has a first holder face 23a extending along the first reference plane R1EF. The semiconductor device 15 supports the first holder face 23a on the principal face 15a. The second portion 23c of the holder 23 has a second holder face 23d extending along a third reference plane R3FE which intersects the second axis Ax2. The circuit board 13 supports the second holder face 23d on the second region 13c. In the present embodiment, the third reference plane R3EF is substantially parallel to the first reference plane R1EF, and for example, the angular difference between the first holder face 23a and the second holder face 23d is, for example, in the range of −10 to +10 degrees.

Further, as understood from the above description, the optical processing apparatus 11 is provided with the circuit board 13, the semiconductor device 15, the optical connector 17, and the support base 19 which is disposed between the second area 13c of the circuit board 13 and the holder 23 of the optical connector 17. The optical connector 17 is provided with the optical fibers 21 and the holder 23, which holds the optical fibers 21. The holder 23 is provided with the first and second portions 23b and 23c, which are arranged in the direction of the first axis Ax1. The first portion 23b of the holder 23 and the semiconductor device 15 are arranged in the direction of the second axis Ax2 such that the semiconductor device 15 supports the first portion 23b of the holder 23 on the principal face 15a thereof. The second part 23c of the holder 23 and the second area 13c of the circuit board 13 are arranged in the direction of the second axis Ax2 such that the circuit board 13 supports the second part 23c of the holder 23 on the second area 13c thereof.

As seen from the above description, the optical processing apparatus 11 according to the present embodiment has a structure which allows the optical processing apparatus 11 to have a thickness smaller than the sum of the thicknesses of the optical connector 17 and the semiconductor device 15 that make the optical coupling therebetween. In addition, the optical connector 17 according to the present embodiment is provided with the second holder part 27 which has a shorter length than that of the first holder part 25, and the second holder part 27 of the optical connector 17 is supported by the circuit board 13. In the embodiment, the optical fibers 21 in the optical connector 17 are supported by the first holder part 25 of the optical connector 17 in the vicinity of the edge of the circuit board 13, thereby preventing the optical fibers 21 from making contact with the circuit board 13. The optical connector 17 does not require a large support area on the circuit board 13 in making optical coupling with the semiconductor device 15, which is mounted on the board.

As seen from the above description on the present embodiment, the optical connector has a structure that provides the optical processing apparatus with a thickness smaller than the sum of the thicknesses of the optical connector and the semiconductor device in making the optical coupling between the optical connector and the semiconductor device. The optical connector has a structure that can avoid the vertical stacking of the optical connector and the semiconductor device in making optical coupling with a semiconductor device mounted on a supporting board, which results in that the optical processing apparatus is provided with a thickness that is smaller than the sum of the thickness of the semiconductor device and the length of the optical connector.

Having described and illustrated the principle of the invention in a preferred embodiment thereof, it is appreciated by those having skill in the art that the invention can be modified in arrangement and detail without departing from such principles. We therefore claim all modifications and variations coining within the spirit and scope of the following claims.

What is claimed is:

1. An optical processing apparatus comprising:
    a circuit board including a first area and a second area, the first area and the second area being arranged in a direction of an axis;
    a semiconductor device having an optical coupling element, the semiconductor device being disposed on the first area of the circuit board;
    an optical connector including a holder and an optical fiber, the optical connector being supported by the second area of the circuit board and a principal face of the semiconductor device; and
    a supporting base having a thickness smaller than that of the semiconductor device,
    the holder including a first holder part and a second holder part,
    the supporting base being disposed between the second area of the circuit board and the second holder part of the optical connector,
    the optical fiber including a first optical fiber portion and a second optical fiber portion, the first optical fiber portion being supported by the first holder part so as to extend in the direction of the axis, and the second optical fiber portion being held by the first holder part and the second holder part,
    the first optical fiber portion having a cladding face and a tip end, the cladding face extending along a first reference plane, the first reference plane extending in the direction of the axis,
    the cladding face being positioned with respect to the optical coupling element and being apart from the principal face of the semiconductor device.

2. The optical processing apparatus according to claim 1, wherein
    the optical connector has an oblique face extending along a second reference plane inclined with respect to the first reference plane,
    the optical fiber has an end face at the tip end thereof, and the end face extends along the second reference plane.

3. The optical processing apparatus according to claim 2, wherein the optical connector includes a reflecting member on the oblique face.

4. The optical processing apparatus according to claim 1, wherein
    the optical fiber includes a third optical fiber portion, and
    the third optical fiber portion is supported by the first holder part so as to extend in the direction of the axis.

5. The optical processing apparatus according to claim 4, wherein
    the first optical fiber portion and the second optical fiber portion are arranged along the first reference plane,
    the first holder part has a recess recessed in a direction from the first reference plane to the first holder part, and
    the third optical fiber portion is fixed to the recess.

6. The optical processing apparatus according to claim 1, wherein the optical connector includes a pigtail fiber extending outward from the holder.

* * * * *